No. 874,652. PATENTED DEC. 24, 1907.
G. W. BAILEY.
VALVE.
APPLICATION FILED APR. 19, 1907.

Witnesses
T. P. Britt
Geo. Heinicke

Inventor
George W. Bailey
By
G. Dittmar
Attorney

UNITED STATES PATENT OFFICE.

GEORGE W. BAILEY, OF WASHINGTON, DISTRICT OF COLUMBIA

VALVE.

No. 874,652.　　Specification of Letters Patent.　　Patented Dec. 24, 1907.

Application filed April 19, 1907. Serial No. 369,160.

*To all whom it may concern:*

Be it known that I, GEORGE W. BAILEY, a citizen of the United States, residing at Washington, in the District of Columbia, have invented certain new and useful Improvements in Valves, of which the following is a full, clear, and exact specification.

The object of the present invention is to provide a valve that will stand the wear and tear as well as any metal valve and yet will close tightly at all times.

Heretofore attempts have been made to produce a tight closing of metal valves by lining with leather or rubber the part of the valve plate coming in contact with and striking the seat, but the lining is worked away very quickly by the continuous action and the heavy blows of the valve plate. Attempts have also been made to provide the extreme edge of a valve plate with a gasket in such a way, that it is not exposed to the blow of the valve plate, but it has been found in practice that a lower pressure is not sufficient to force the rubber gasket sufficiently against the seat and leakage of the valve can not be prevented.

The present invention purports to obviate these inconveniences, and to produce a valve that will keep tight under all pressures, that will prevent the rapid wearing off of the gasket, metallic parts of the valve plate contacting with the metallic valve seat, and which by its peculiar packing will form a cushion so that the metallic parts strike upon each other with a softened blow.

Figure 1:
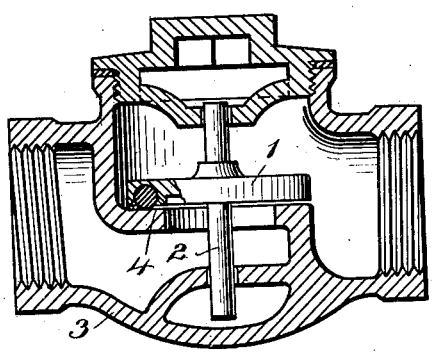
Figure 2:
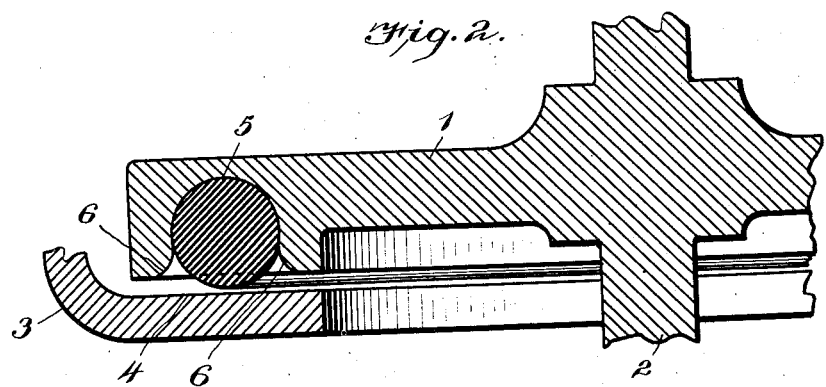
Figure 3:
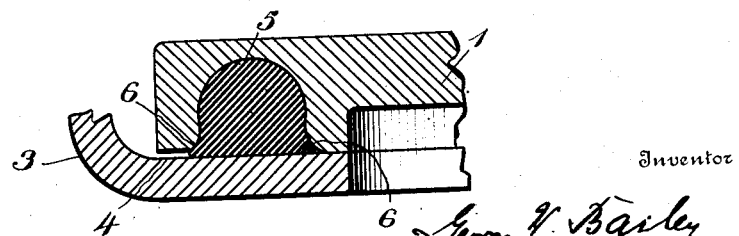

In the accompanying drawing forming part of this specification, Figure 1 shows in longitudinal section an ordinary check valve provided with my improvement, Fig. 2 shows at an enlarged scale and in section the valve seat and the valve plate with the gasket. Fig. 3 is the same view and shows the valve plate under pressure upon the valve seat and the gasket compressed.

The valve plate 1 is guided by its stem 2 in the valve casing 3 in the ordinary well known manner.

The lower face of the valve plate 1 at the edge being opposite to the valve seat 4, is provided with a deep annular undercut groove 5 shown in the example as approximately of semi-circular cross-section. The edges of the groove are rounded as shown at 6 for a purpose to be explained below. Thus the groove is widened out at its opening and evidently a ring or gasket of rubber of circular or cylindrical cross-section can easily be forced into the groove and will be retained therein by the undercut edges which extend a little beyond the semi-circular shape as can be clearly seen in Fig. 2. The rubber gasket is perferably so shaped that the part not being sealed in the valve plate projects somewhat beyond the surface of the valve plate, so that part 6 when the valve closes will strike the seat 4 first and the gasket will be flattened till the metal parts of the face of the valve come in contact with the seat. In this way the valve plate is cushioned and the jerk under heavy pressure will be greatly moderated. The rounded edges 6 forming a widening of the opening of the groove permit the rubber to distend and therefore the rubber gasket can not be worked away as in ordinary leather lined valve plates, since the metal of the valve plate comes continually in contact with the metal of the seat. The whole load of pressure acting upon the valve plate is transferred on the gasket which is therefore flattened and extended as explained until the metallic contact of the valve parts prevents any further destructive distention. This valve offers also the advantage that the valve plate need not be ground upon the valve seat.

Both contacting surfaces can remain rough since the elastic gasket is so tightly pressed under the full load of the water pressure against the seat that it must keep absolutely tight and detrimental compressing of the distended rubber gasket cannot occur since the metal parts when contacting take all the load of the water pressure, which keeps the confined gasket in a partly compressed position, flattened on the seat and distended in the enlargements 6 so that a leakage cannot occur.

Fig. 3 illustrates that the rubber gasket in its confinement forms a tight joint on the valve seat, and how the inner metallic edge of the valve plate by contacting with the valve seat prevents a compression of the gasket which would be apt to quickly wear out the contacting rubber parts. The latter when the valve reopens takes immediately the natural rounded form as in Fig. 2. Fig. 3 shows also that the outer metallic edge of the valve plate may be made to stand back from the face of the valve plate so that the inner edge alone comes in contact with the valve seat.

Having thus described my invention, what I claim is:

1. In a valve, a valve plate of greater diameter than the port surrounded by the valve seat, an annular groove in the face of the valve plate near its edge and opposite the valve seat an enlargement or widening of the groove near its opening edges, metallic bearing surfaces on the sides of said edges, an annular packing ring or gasket in said groove and normally projecting beyond the face of the valve plate to receive the impact thereof, and adapted to be distended laterally into the enlargements by contact with the valve seat, and under the full load of pressure bearing upon the valve plate.

2. In a valve a valve plate of greater diameter than the port surrounded by the valve seat, an annular groove in the face of the valve plate near its edge and opposite the valve seat having a bottom of semi-cylindrical cross-section and an enlargement or widening of the groove near its opening edges, metallic bearing surfaces on the sides of said edges, an annular packing ring or gasket of cylindrical cross-section in said groove and normally projecting beyond the face of the valve plate to receive the impact thereof, and adapted to be distended laterally into the enlargements by contact with the valve seat, and under the full load of pressure bearing upon the valve plate.

3. In a valve a valve plate of greater diameter than the port surrounded by the valve seat, an annular groove in the face of the valve plate near its edge and opposite the valve seat having a bottom of semi-cylindrical cross-section and an enlargement or widening of the groove near its opening edges, a metallic bearing surface on the inside of the opening of said groove, an annular packing ring or gasket of cylindrical cross-section in said groove and normally projecting beyond the face of the valve plate to receive the impact thereof, and adapted to be distended laterally into the enlargements by contact with the valve seat, and under the full load of pressure bearing upon the valve plate.

In testimony whereof I affix my signature.

GEORGE W. BAILEY.

In the presence of—
 GEO. HEINIKE,
 G. DITTMAR.